(12) United States Patent
Igawa

(10) Patent No.: US 9,643,402 B2
(45) Date of Patent: May 9, 2017

(54) METHOD FOR PRINTING METAL-TONE PRINTED MATTER AND METAL-TONE PRINTED MATTER

(71) Applicant: MIMAKI ENGINEERING CO., LTD., Tomi (JP)

(72) Inventor: Tomomi Igawa, Tomi (JP)

(73) Assignee: MIMAKI ENGINEERING CO., LTD., Tomi (JP)

( * ) Notice: Subject to any disclaimer, the term of this patent is extended or adjusted under 35 U.S.C. 154(b) by 338 days.

(21) Appl. No.: 13/954,982

(22) Filed: Jul. 31, 2013

(65) Prior Publication Data

US 2013/0314470 A1 Nov. 28, 2013

Related U.S. Application Data

(63) Continuation of application No. PCT/JP2011/080493, filed on Dec. 28, 2011.

(30) Foreign Application Priority Data

Feb. 15, 2011 (JP) .................................. 2011-029902

(51) Int. Cl.
| | | |
|---|---|---|
| B44C 1/165 | (2006.01) | |
| B44C 1/175 | (2006.01) | |
| B29C 65/48 | (2006.01) | |
| B32B 37/12 | (2006.01) | |
| B32B 37/26 | (2006.01) | |

(Continued)

(52) U.S. Cl.
CPC ............... B41J 2/01 (2013.01); B32B 27/08 (2013.01); B32B 27/32 (2013.01); B41M 5/0256 (2013.01); B41M 5/03 (2013.01); B42D 15/00 (2013.01); B44C 1/1712 (2013.01);

(Continued)

(58) Field of Classification Search
CPC .......... B32B 2255/10; B32B 2255/205; B32B 27/08; B32B 27/32; B41J 2/01; B42D 15/00; B44C 1/1712; C09D 11/037; C09D 11/101
USPC ....... 156/233, 230, 237, 240, 241, 247, 249, 156/272.2, 273.3, 275.5, 275.7, 277, 156/307.1, 307.3, 307.5, 307.7
See application file for complete search history.

(56) References Cited

U.S. PATENT DOCUMENTS

2010/0075052 A1* 3/2010 Irita ..................... B41M 5/0017
427/288

FOREIGN PATENT DOCUMENTS

| JP | 64-018698 | 1/1989 |
| JP | 2003-305941 | 10/2003 |

(Continued)

OTHER PUBLICATIONS

English translation of JP2007-160648.*

(Continued)

*Primary Examiner* — Sing P Chan
(74) *Attorney, Agent, or Firm* — Mori & Ward, LLP

(57) ABSTRACT

In a method for printing a metal-tone printed matter, a metallic ink which includes metal particles dispersed in a solvent is applied onto a smooth printing surface of a printing medium to provide a metallic ink layer containing a metal layer having the metal particles accumulated on a printing surface side closer to the smooth printing surface in the metallic ink layer. The printing medium is reversed to transfer the metallic ink layer onto a material to be transferred while making a smooth surface of the metal layer as a display surface.

13 Claims, 2 Drawing Sheets

(51) Int. Cl.

| | |
|---|---|
| B32B 38/10 | (2006.01) |
| B32B 38/14 | (2006.01) |
| B41J 2/01 | (2006.01) |
| C09D 11/101 | (2014.01) |
| B42D 15/00 | (2006.01) |
| B41M 5/025 | (2006.01) |
| B41M 5/03 | (2006.01) |
| B44C 1/17 | (2006.01) |
| C09D 11/037 | (2014.01) |
| B32B 27/08 | (2006.01) |
| B32B 27/32 | (2006.01) |

(52) U.S. Cl.
CPC .......... *C09D 11/037* (2013.01); *C09D 11/101* (2013.01); *B32B 2255/10* (2013.01); *B32B 2255/205* (2013.01)

(56) References Cited

FOREIGN PATENT DOCUMENTS

| JP | 2004-142107 | 5/2004 | |
| JP | 2005-349778 | 12/2005 | |
| JP | 2006/123390 | 5/2006 | |
| JP | 2007-160648 | 6/2007 | |
| JP | 2008-174712 | 7/2008 | |
| JP | 2009-107283 | 5/2009 | |
| WO | WO 2012111242 A1 * | 8/2012 | ................ B41J 2/01 |

OTHER PUBLICATIONS

English translation of JP2004-142107.*
English translation of JP64-18698.*
English translation of International Search Report for PCT/JP2011/080495; Mar. 19, 2012.*
International Search Report for corresponding International Application No. PCT/JP2011/080493, Mar. 19, 2012.
Japanese Office Action for corresponding JP Application No. 2011-029902, Nov. 21, 2013.
Japanese Office Action for corresponding JP Application No. 2011-029902, Feb. 24, 2014.
Japanese Office Action for corresponding JP Application No, 2011-029902, Jan. 9, 2015.
Chinese Office Action for corresponding CN Application No. 201180087588.7, Jan. 7, 2015.
Japanese Office Action for correspondlng JP Application No. 2011-29902, Feb. 9, 2015.
Japanese Office Action for corresponding JP Application No. 2011-29902, May 17, 2016.

* cited by examiner

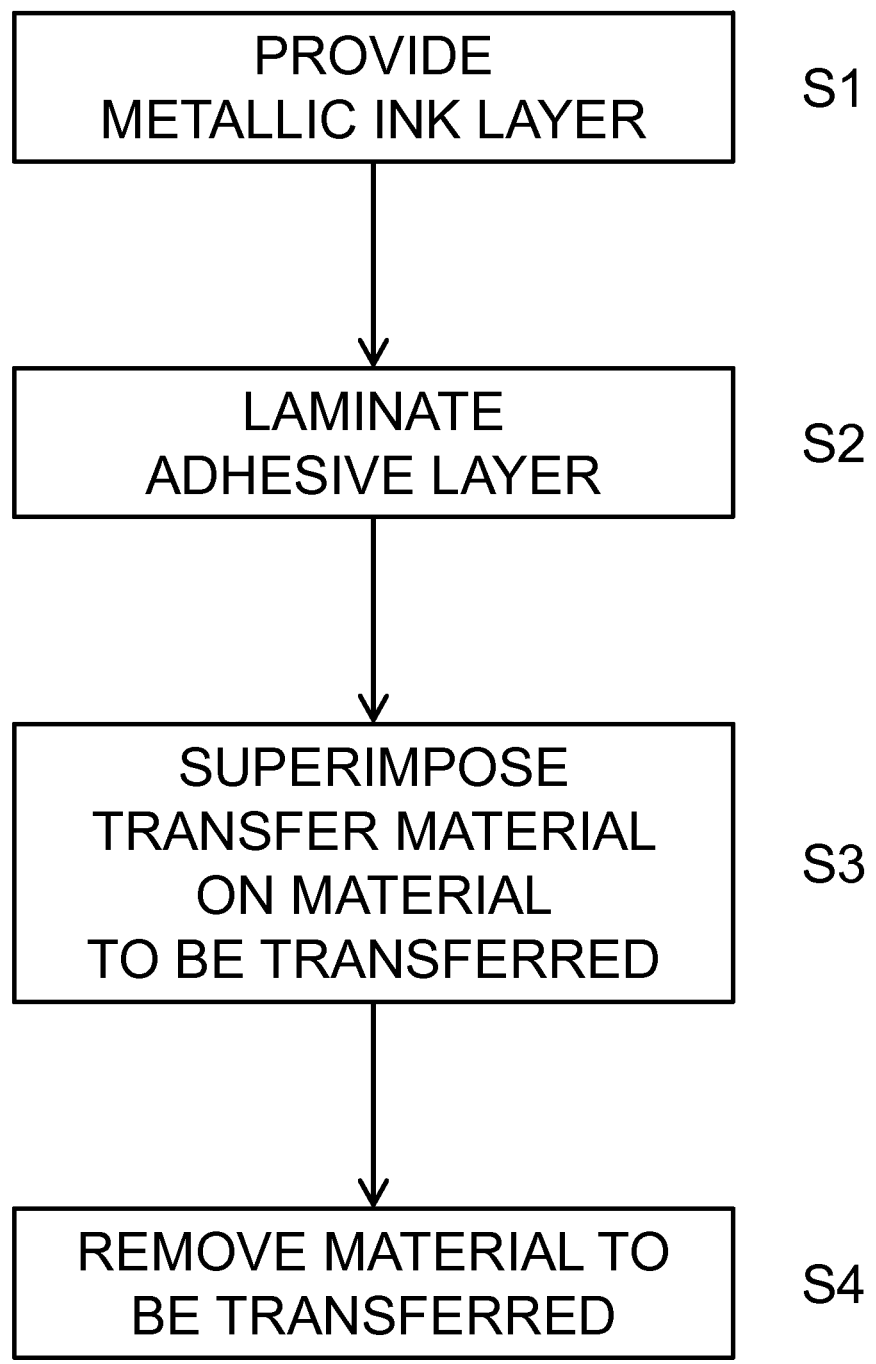

METHOD FOR PRINTING METAL-TONE PRINTED MATTER AND METAL-TONE PRINTED MATTER

The present application is a continuation application of International Application No. PCT/JP2011/080493, filed Dec. 28, 2011, which claims priority to Japanese Patent Application No. 2011-029902, filed Feb. 15, 2011. The contents of these applications are incorporated herein by reference in their entirety.

BACKGROUND OF THE INVENTION

Field of the Invention

The present invention relates to a method for printing a metal-tone printed matter and a metal-tone printed matter printed.

Discussion of the Background

As a metal-tone printed matter giving a texture such as a metal to the surface thereof, there is, for example, proposed a metal-tone resin film prepared by heat press laminating a printing layer of a metallic ink transferred onto a base material layer and a skin layer which is laminated on the printing layer and in which hairlines are formed on one surface thereof.

In addition, as for a method for producing this metal-tone resin film, for example, an acrylic release layer is laminated on a printing auxiliary film such as a PET film, etc., a printing layer is laminated with a metallic ink by means of gravure printing, and a vinyl acetate based adhesive layer is then laminated on the printing layer to form a transfer film. Subsequently, the transfer film is superimposed on a base material layer made of a thermoplastic film while facing the adhesive layer downward, followed by heat transfer. Then, the printing auxiliary film that is an uppermost layer is removed to form a printing film. Finally, a skin layer on one surface of which hairlines are formed by sandpaper or the like is laminated on the printing layer of the printing film, followed by heat press lamination. It is disclosed that according to this, a metal-tone resin film in which the skin layer is hardly separated without causing a crack of the metallic ink (see JP-A-2006-123390).

SUMMARY OF THE INVENTION

According to one aspect of the present invention, in a method for printing a metal-tone printed matter, a metallic ink which includes metal particles dispersed in a solvent is applied onto a smooth printing surface of a printing medium to provide a metallic ink layer containing a metal layer having the metal particles accumulated on a printing surface side closer to the smooth printing surface in the metallic ink layer. The printing medium is reversed to transfer the metallic ink layer onto a material to be transferred while making a smooth surface of the metal layer as a display surface.

According to another aspect of the present invention, a metal-tone printed matter includes a material to be transferred and a metallic ink layer transferred onto the material to be transferred using the method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a flowchart expressing a printing process of a metal-tone printed matter.

DESCRIPTION OF THE EMBODIMENTS

Figure 2A:
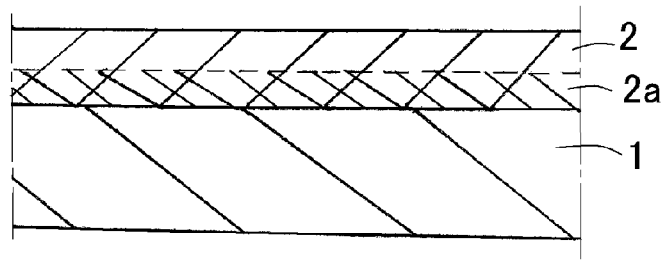
FIGS. 2A to 2D are each a schematic cross-sectional view expressing a printing step of a metal-tone printed matter.

The embodiments will now be described with reference to the accompanying drawings, wherein like reference numerals designate corresponding or identical elements throughout the various drawings.

A metallic ink having metal particles dispersed in a solvent, which is used in the present embodiment, is illustrated as follows. As an example, a solvent-type solvent ink containing a solvent is used as an ink for inkjet printing. An ink containing ink components, for example, from 80 to 95% by weight of Pnb (polypropylene glycol normal butyl ether) as a prime solvent; from less than 1% by weight to 20% by weight of IPA (isopropyl alcohol), ethyl acetate, propyl acetate, etc. as another solvent; from less than 1% by weight to 5% by weight of an aluminum paste (or an aluminum alloy) that is a pigment as a metal particle; and less than 1% by weight of a synthetic resin (e.g., nitro cellulose, etc.) as a binder, is used.

The form of the metal particle contained in the aluminum paste (or the aluminum alloy) may be either a three-dimensional granular form or a flat flaky form (leaf-like form). In the present embodiment, a flat flaky form (leaf-like form) is adopted. Incidentally, it is also possible to use a UV-curable ink as described later in place of the solvent ink.

In addition, the metal particle is not limited to the aluminum paste (or the aluminum alloy) displaying a silver color but may be a bronze powder (mixture of a copper powder and a zinc powder) displaying a gold color, a colored gold ink prepared by mixing an aluminum paste (or an aluminum alloy) and a yellow ink, or the like.

In addition, as for the transfer material which is used as the printing medium, for example, a non-stretched sheet material having a receiving layer capable of receiving the solvent (e.g., a PET based film, an acrylic film, an olefin based film, etc.), a block material, or the like is useful. The reason why the non-stretched transfer material is used resides in the matter that assuming that the transfer material is stretched, when the transfer material is transferred onto the material to be transferred other than a flat surface, a distortion or deformation of the printing surface becomes large, whereby the printing quality is lowered. It is desirable that the transfer surface of the transfer material is formed in a smooth surface; and that a release layer (for example, a layer coated with a fluorine based resin, a silicone based resin, a wax, or the like) is formed in advance. In the experiment, a non-stretched polyolefin based film in which the transfer surface thereof is a smooth surface with wettability and has releasability was used.

Incidentally, so long as the transfer material is formed of a light transmitting material, it is possible to use the transfer material as a coating material for the printing medium.

For the adhesive, for example, a hot melt adhesive, a binder, a UV-curable adhesive, or the like is useful. The adhesive layer is formed by a variety of printing methods such as coating machine printing, screen printing, inkjet printing, etc.

Alternatively, the adhesive layer can also be allowed to function by a metallic fixing resin (binder) of the metallic ink layer.

In addition, the material to be transferred onto which a transfer image containing the metallic ink layer formed on the transfer material is transferred is not particularly limited so long as it is a member onto which the transfer image is able to adhere, and the adhesive surface is not limited to a flat surface but may also be a curved surface. In the present embodiment, the transfer image formed on a polyolefin based film as the transfer material was transferred onto a resin molded material (e.g., an acrylic resin material, a polycarbonate resin material, etc.) as the material to be transferred.

Incidentally, as described later, in the case of using a UV-curable ink for the adhesive layer, it is necessary to use a light transmitting material having light transmission properties for the material to be transferred. As described later, this is because on the occasion of transferring the transfer image printed on the transfer material onto the material to be transferred via the UV-curable adhesive layer, it is necessary that UV light is radiated from the side of the material to be transferred opposite to the printing surface thereof to cure the UV-curable adhesive layer, and the metallic ink layer is separated from the transfer surface of the transfer material.

Next, an example of the method for printing a metal-tone printed matter is described on the basis of a flowchart of FIG. 1 while referring to schematic cross-sectional views of FIGS. 2A to 2D.

First of all, in FIG. 2A, a metallic ink layer 2 is printed on a polyolefin film 1 having a smooth printing surface (transfer surface) (hereinafter referred to as "transfer material") using a solvent ink (metallic ink) having flaky aluminum particles (metal particles) having an outer shape of about 5 μm dispersed in a solvent. In addition, by using the solvent ink, the aluminum particles become easy to accumulate following the smooth transfer surface of the transfer material 1. As for the printing mode, it is possible to achieve printing adopting a variety of printing methods such as inkjet printing, screen printing, etc. (Step S1). At that time, after printing the metallic ink layer 2 on the transfer material 1 using the solvent ink, when drying is performed with a heater or the like, the solvent volatilizes, and the aluminum particles are accumulated on the smooth printing surface (transfer surface) side to form a metal layer 2a having a thickness of from about 0.1 μm to 0.2 μm. According to the inkjet printing, when the aluminum particles contained in ink droplets are landed onto the transfer material 1, the aluminum particles are accumulated on the smooth printing surface (transfer surface) side, whereby the metallic ink layer 2 can be formed. At that time, a surface roughness of the printing surface (transfer surface) is not more than 2 μm, and more preferably not more than 1 μm.

Figure 2B:
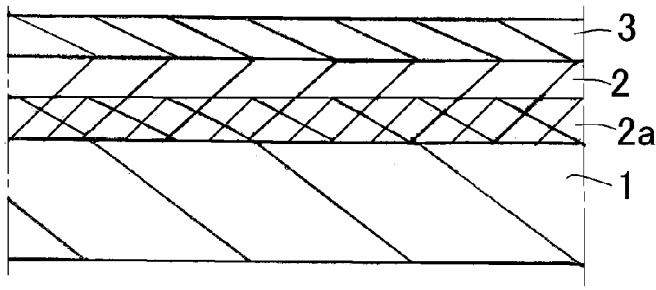

Subsequently, as shown in FIG. 2B, an adhesive layer is laminated on the metallic ink layer 2 printed on the transfer material 1. For example, a hot melt adhesive is laminated and formed on the metallic ink layer by a variety of printing methods such as coating machine printing, screen printing, inkjet printing, etc. (Step S2 in FIG. 1).

Figure 2C:
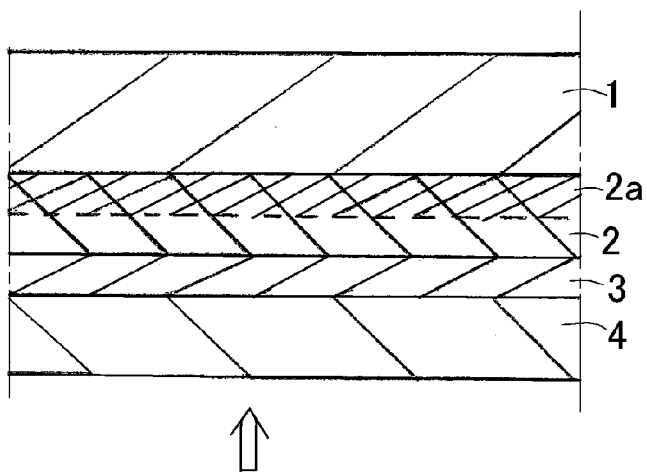

Subsequently, as shown in FIG. 2C, the transfer material 1 is reversed and superimposed on a material 4 to be transferred (e.g., an acrylic resin material, a polycarbonate resin material, etc.) via the adhesive layer 3 (Step S3 in FIG. 1). At that time, even when the superimposition surface of the material 4 to be transferred is not a flat surface but a three-dimensional curved surface, for example, a surface which is convex upward, the transfer material 1 (polyolefin film) can be superimposed following the surface properties of the printing surface (adhesive surface). Then, by heating and pressing the transfer material 1 against the material 4 to be transferred at a prescribed temperature (from 80° C. to 120° C.) at which the adhesive layer 3 is cured, the adhesive layer 3 is thickened, whereby the metallic ink layer 2 adheres onto the printing surface (adhesive surface).

Figure 2D:
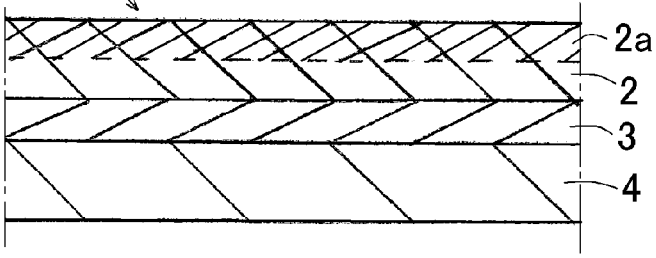

Finally, as shown in FIG. 2D, by peeling off the transfer material 1, the metallic ink layer 2 is separated from the transfer surface of the transfer material 1 having been subjected to a release treatment, whereby the metallic ink layer 2 is transferred onto the material 4 to be transferred while making the metal layer 2a made of aluminum particles as the most superficial layer (Step S4 in FIG. 1).

In a metal-tone printed matter 5 printed by the above-described printing method (see FIG. 2D), the metallic ink layer 2 is printed on the smooth transfer surface of the transfer material 1 (polyolefin film) in the printing step; the adhesive layer 3 is laminated and formed on the metallic ink layer 2; and thereafter, the transfer material 1 is reversed and superimposed to adhere onto the material 4 to be transferred via the adhesive layer 3, followed by removing the transfer material 1. According to this, in the metallic ink layer 2 transferred onto the material 4 to be transferred, the metal layer 2a composed of aluminum particles accumulated along the smooth printing surface (transfer surface) is the display surface side, and hence, it becomes possible to achieve metallic printing with high brightness and glossy feel without causing darkening of a metallic color.

In the foregoing embodiment, while the solvent ink containing a solvent was used as an example of the metallic ink, a UV-curable ink diluted with a solvent may also be used for the metallic ink layer 2. Though the printing step is the same as that in the flowchart of FIG. 1, the description is hereunder made centering on different steps.

In the printing step (Step S1 in FIG. 1) and the adhesive coating step (Step S2 in FIG. 1), the metallic ink is discharged onto the transfer surface of the transfer material from inkjet heads using an inkjet printing apparatus, and immediately thereafter, UV light is radiated from a UV irradiation lamp mounted in a carriage, thereby printing the metallic ink layer 2. Thereafter, a UV-curable adhesive (UV ink) is discharged onto the metallic ink layer 2 from inkjet heads, thereby forming the adhesive layer 3. The adhesive layer 3 is not irradiated with UV light because an adhesion step is performed as a post step.

In this way, since the metallic ink layer 2 and the adhesive layer 3 can be printed by superimposing the UV inks by means of inkjet printing using the inkjet printing apparatus, the formation of a transfer image by the metallic ink onto the transfer material 1 can be easily achieved. In particular, when the transfer image is formed by means of inkjet printing, the lamination can be performed in such a manner that the adhesive layer 3 is not protruded from the metallic ink layer 2, and hence, the printing surface subsequently transferred onto the material 4 to be transferred is free from staining of the adhesive, so that finishing of the printed matter becomes good.

In addition, in the transfer step of the metallic ink layer 2 (Step S3 in FIG. 1), a light transmitting material having light transmission properties (e.g., an acrylic resin material, a polycarbonate resin material, etc.) is used for the material 4 to be transferred. This is because in FIG. 2C, the transfer material 1 is superimposed on the material 4 to be transferred via the adhesive layer 3, UV light is radiated from the side (arrow direction in FIG. 2C) of the material 4 to be transferred opposite to the printing surface thereof to cure the adhesive layer 3, and the transfer material 1 is then separated from the metallic ink layer 2.

In the light of the above, as another embodiment regarding the metallic ink, when the metallic ink layer 2 is printed on the transfer material 1 using the inkjet printing apparatus, not only the printing step can be simplified and efficiently performed, but a printing area of the adhesive layer 3 can be formed in conformity with the metallic ink layer 2, so that finishing of the printed matter transferred onto the material 4 to be transferred becomes good.

Incidentally, in the printing step, UV color ink layers may be superimposed and printed on the surface of the metal ink layer 2. In that case, by adding a colorful color to the metallic color with high brightness and glossy feel on the printed matter, decorativeness can be enhanced. Alternatively, by laminating a UV clear ink layer (transparent ink layer) on the metal ink layer 2, it is also possible to add to the printed matter a texture (stereoscopic effect or depth) in addition to a glossy feel.

A method for printing a metal-tone printed matter according to the embodiment is characterized by including a printing step of printing a metallic ink having metal particles dispersed in a solvent on a printing medium having a smooth printing surface to form a metallic ink layer containing a metal layer having the metal particles accumulated on the printing surface side thereof; and a step of reversing the printing medium to transfer it onto a material to be transferred while making the smooth metal layer side as a display surface.

In that case, the form of the metal particles may be either a three-dimensional granular form or a flat flaky form (leaf-like form).

In the embodiment, it is preferable that the metallic ink contains a solvent, and when the metallic ink layer is printed on the printing medium, the solvent volatilizes, whereby the metal particles accumulate on the smooth printing surface side to form the metal layer. Since the metallic ink contains the solvent, the metal particles move easily in the solvent, and the metallic ink is low in viscosity, easy to cause leveling and good in wettability. Accordingly, when the metallic ink layer is printed on the transfer material, the solvent volatilizes, whereby the metal particles accumulate on the transfer surface side to easily form the metal layer. Therefore, in the metallic ink layer seen from the transfer surface side, the metal particles are laminated with good orientation, so that the glossy surface can be formed without causing darkening of a metallic color.

In addition, in the embodiment, the printing medium may be a transfer material. The method according to the embodiment may also include a step of superimposing the transfer material on the material to be transferred to allow the metallic ink layer to adhere directly or indirectly thereonto and a step of removing the transfer material to transfer the metallic ink layer as a surface layer of the material to be transferred. In that case, since a release layer is formed in advance on the transfer surface of the transfer material, by superimposing the transfer material on the material to be transferred via an adhesive layer and heating and pressing the resultant, the adhesive layer is thickened, whereby the metallic ink layer is easily separated from the transfer surface of the transfer material. Therefore, the metallic ink layer formed on the transfer material can be easily transferred onto the printing surface of the material to be transferred by means of heat transfer. At that time, the printing surface of the material to be transferred may be either a planar surface or a three-dimensional curved surface.

In addition, the method according to the embodiment may also include a step of laminating an adhesive layer on the metallic ink layer formed by printing the metallic ink on the transfer material, thereby allowing the adhesive layer to adhere onto the material to be transferred.

In addition, in the embodiment, the transfer material may be superimposed on the material to be transferred, thereby allowing the metallic ink layer to adhere onto the material to be transferred.

In addition, in the embodiment, the material to be transferred may be a light transmitting material having light transmission properties. The metallic ink layer may be allowed to adhere onto the material to be transferred by superimposing the transfer material on the material to be transferred via a UV-curable adhesive layer and radiating UV light from the side of the material to be transferred opposite to the printing surface thereof to cure the UV-curable adhesive layer.

Furthermore, in the embodiment, it is preferable that the metallic ink layer is formed by printing a solvent based ink diluted with a solvent, followed by drying.

Moreover, the printing step of the embodiment may be carried out in such a manner that the metallic ink layer is printed on the printing medium by an inkjet printing apparatus. In that case, an ink having a viscosity of from 7 to 10 cps (centipoises) is generally used as the ink for inkjet printing, and this viscosity is low as compared with that used for gravure printing or screen printing or the like. Therefore, when the metal particles contained in ink droplets are landed onto the printing surface (transfer surface), the metal particles are accumulated on the printing surface side to form the metallic ink layer, so that a glossy surface can be formed.

In addition, in the case of printing the metallic ink layer by means of inkjet printing, an adhesive area is also formed in conformity with the metallic ink layer as compared with the case of separately laminating and forming the adhesive layer, and hence, the printing surface transferred onto the material to be transferred is free from staining of the adhesive, so that finishing of the printed matter becomes good.

In the metal-tone printed matter according to the embodiment, it is preferable that the metallic ink layer is printed adopting any one of the above-described methods for printing a metal-tone printed matter.

According to the embodiment, when a metallic ink having metal particles dispersed in a solvent is printed on a printing medium having a smooth printing surface in a printing step, a metallic ink layer having a metal layer in which the metal particles are accumulated following the smooth printing surface side is formed. This printing medium is reversed and superimposed on a material to be transferred, whereby it can be transferred onto the material to be transferred while making the metal layer of the metallic ink layer as a display surface side. According to this, in the metallic ink layer transferred onto the material to be transferred, the metal layer made of metal particles accumulated along the smooth printing surface is the display surface side, and hence, it becomes possible to achieve metallic printing with high brightness and glossy feel without causing darkening of a metallic color.

In metal-tone printed matters printed adopting the above-described printing method according to the embodiment, a vivid and highly bright metal-tone printed matter can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A method for printing a metal-tone printed matter, comprising:

jetting a metallic ink which includes metal particles dispersed in a UV-curable ink diluted with solvent onto a printing surface of a printing medium, using inkjet printing, to provide a metallic ink layer including an outer surface and a metal layer which is provided on a side of the smooth printing surface opposite to the outer surface and which includes the metal particles accumulated on the side of the printing surface, wherein the printing surface has wettability to ink, and wherein the jetting accumulates and arranges the metal particles on the printing surface;

radiating UV light onto the metallic ink to cure the UV-curable ink after jetting; and providing the printing medium on a material such that the outer surface of the metallic ink layer is sandwiched between the material and the metal layer to transfer the metallic ink layer onto the material.

2. The method for printing a metal-tone printed matter according to claim 1, wherein the printing medium comprises a transfer material, the method further comprising:

superimposing the transfer material on the material to be transferred to allow the metallic ink layer to adhere directly or indirectly onto the material to be transferred; and removing the transfer material to transfer the metallic ink layer as a surface layer of the material to be transferred.

3. The method for printing a metal-tone printed matter according to claim 2, further comprising:

laminating an adhesive layer on the metallic ink layer provided by printing the metallic ink on the transfer material, wherein the superimposing of the transfer material includes superimposing the transfer material on the material to be transferred to allow the adhesive layer to adhere onto the material to be transferred.

4. The method for printing a metal-tone printed matter according to claim 2, wherein the material to be transferred comprises a light transmitting material having light transmission properties, and wherein the metallic ink layer is allowed to adhere onto the material to be transferred by superimposing the transfer material on the material to be transferred via a UV-curable adhesive layer and by radiating UV light from a side of the material to be transferred opposite to a printing surface of the material to be transferred to cure the UV-curable adhesive layer.

5. The method for printing a metal-tone printed matter according to claim 1, wherein the metallic ink layer is provided by printing a solvent based ink diluted with a solvent, followed by drying.

6. The method for printing a metal-tone printed matter according to claim 1, wherein the printing of the metallic ink includes printing the metallic ink layer on the printing medium by an inkjet printing apparatus.

7. A method for printing a metal-tone printed matter, comprising:

jetting a metallic ink which includes metal particles dispersed in a UV-curable ink diluted with solvent onto a release layer on a printing surface of a printing medium, using inkjet printing, to provide a metallic ink layer including an outer surface and a metal layer which is provided on a side of the smooth printing surface opposite to the outer surface and which includes the metal particles accumulated on the side of the printing surface, wherein the release layer on the printing surface has wettability to ink, and wherein the jetting accumulates and arranges the metal particles on the release layer on the printing surface;

radiating UV light onto the metallic ink to cure the UV-curable ink after jetting; and providing the printing medium on a material such that the outer surface of the metallic ink layer is sandwiched between the material and the metal layer to transfer the metallic ink layer onto the material.

8. The method for printing a metal-tone printed matter according to claim 7, wherein the printing medium comprises a transfer material, the method further comprising:

superimposing the transfer material on the material to be transferred to allow the metallic ink layer to adhere directly or indirectly onto the material to be transferred; and removing the transfer material to transfer the metallic ink layer as a surface layer of the material to be transferred.

9. The method for printing a metal-tone printed matter according to claim 8, further comprising:

laminating an adhesive layer on the metallic ink layer provided by printing the metallic ink on the transfer material, wherein the superimposing of the transfer material includes superimposing the transfer material on the material to be transferred to allow the adhesive layer to adhere onto the material to be transferred.

10. The method for printing a metal-tone printed matter according to claim 8, wherein the material to be transferred comprises a light transmitting material having light transmission properties, and wherein the metallic ink layer is allowed to adhere onto the material to be transferred by superimposing the transfer material on the material to be transferred via a UV-curable adhesive layer and by radiating UV light from a side of the material to be transferred opposite to a printing surface of the material to be transferred to cure the UV-curable adhesive layer.

11. The method for printing a metal-tone printed matter according to claim 7, wherein the metallic ink layer is provided by printing a solvent based ink diluted with a solvent, followed by drying.

12. The method for printing a metal-tone printed matter according to claim 7, wherein the printing of the metallic ink includes printing the metallic ink layer on the printing medium by an inkjet printing apparatus.

13. The method for printing a metal-tone printed matter according to claim 7, wherein the release layer is a layer coated with a fluorine based resin, a silicone based resin, or a wax.

* * * * *